(12) United States Patent
Okano

(10) Patent No.: US 7,729,053 B2
(45) Date of Patent: Jun. 1, 2010

(54) WAVELENGTH FILTER WITH A BROAD BANDWIDTH OF REFLECTION SPECTRUM

(75) Inventor: Masato Okano, Osaka (JP)

(73) Assignee: Nalux Co., Ltd., Mishima-Gun, Osaka (JP)

( * ) Notice: Subject to any disclaimer, the term of this patent is extended or adjusted under 35 U.S.C. 154(b) by 460 days.

(21) Appl. No.: 10/594,583

(22) PCT Filed: Mar. 24, 2006

(86) PCT No.: PCT/JP2006/305985

§ 371 (c)(1),
(2), (4) Date: May 22, 2007

(87) PCT Pub. No.: WO2006/104045

PCT Pub. Date: Oct. 5, 2006

(65) Prior Publication Data

US 2008/0007832 A1 Jan. 10, 2008

(30) Foreign Application Priority Data

Mar. 25, 2005 (JP) ............................. 2005-089232

(51) Int. Cl.
*G02B 5/18* (2006.01)
(52) U.S. Cl. .................. 359/575; 359/576; 359/569
(58) Field of Classification Search .................. None
See application file for complete search history.

(56) References Cited

U.S. PATENT DOCUMENTS 5,407,738 A * 4/1995 Tabata et al. .................. 428/38
5,472,798 A * 12/1995 Kumazawa et al. ......... 428/690
6,212,312 B1 4/2001 Grann et al.

(Continued)

FOREIGN PATENT DOCUMENTS

JP 2002-258031 9/2002

(Continued)

OTHER PUBLICATIONS

Wang, et al., "Theory and applications of guided-mode resonance filters," Applied Optics, vol. 32, No. 14, May 10, 1993, pp. 2606-2613.

(Continued)

*Primary Examiner*—Arnel C Lavarias
(74) *Attorney, Agent, or Firm*—Squire, Sanders & Dempsey L.L.P.

(57) ABSTRACT

A wavelength filter, includes a grating in which a first portion extends in X direction on a substrate surface and a second portion extends in the X direction along the first portion and are alternately arranged in Y direction perpendicular to the X direction on the substrate surface at a constant cycle shorter than a wavelength of light to be used. A cross-sectional figure of respective first portions in the Y direction and perpendicular to the substrate surface is provided with at least one protruding portion so as to have the width in the Y direction wider than neighboring portions. Plural waveguide layers parallel to the substrate surface are divided by regions parallel to the substrate surface. Wavelength bands of light reflected from the plural waveguide layers shift while overlapping with each other to reflect a wavelength band broader than that reflected from a single waveguide layer.

7 Claims, 9 Drawing Sheets

U.S. PATENT DOCUMENTS 6,248,436 B1 * 6/2001 Kumazawa et al. ......... 428/328
6,306,529 B1 * 10/2001 Shimizu et al. ............. 428/38

FOREIGN PATENT DOCUMENTS

JP  2002-258034  9/2002

OTHER PUBLICATIONS

Jacob et al. "Flat-top narrow-band spectral response obtained from cascaded resonant grating reflection filters," Applied Optics, vol. 41, No. 7, Mar. 1, 2002, pp. 1241-1245.

Thurman, et al., "Controlling the spectral response in guided-mode resonance filter design," Applied Optics, vol. 42, No. 16, Jun. 1, 2003, pp. 3225-3233.

* cited by examiner

PRIOR ART

WAVELENGTH FILTER WITH A BROAD BANDWIDTH OF REFLECTION SPECTRUM

TECHNICAL FIELD

The present invention relates to a wavelength filter, in particular, to a wavelength filter having such characteristic as broad bandwidth of reflection spectrum.

BACKGROUND ART

When constituting an optical system, there is such case that only a light with a specified wavelength is output to perform optical treatment. An optical device capable of outputting the light of bandwidth including a specified wavelength is referred to as a wavelength filter. The wavelength filter can be produced by evaporating a thin film material with a high refractive index and a thin film material with a low refractive index on a substrate of glass or plastic. The wavelength or bandwidth can be adjusted by altering the number of evaporation and thickness of the thin film. In order to enhance the wavelength selectivity, however, the number of evaporation and/or thickness of the thin film are required to be increased. Accordingly, the production process becomes complicated to push up the cost and, since the constitution becomes complicated, the suppression of variation of performance becomes difficult.

Recently, such wavelength filter is proposed that has a simpler construction and a sharp wavelength selectivity, the wavelength filter being produced by forming a diffraction grating having a microscopic periodic structure on a substrate surface, and depositing a high refractive index medium thereon. The wavelength filter has such characteristic that can reflect only a very narrow wavelength band of several nanometers or less, while utilizing the localization (confinement) and scattering effects of light in a periodic structure referred to as a resonance phenomenon. For example, S. S. Wang and R. Magnusson: "Theory and application of guided-mode resonance filters," Applied Optics Vol. 32 No. 14 2606-2613 (1993) discloses a wavelength filter having narrow-band reflection spectrum by arranging a grating structure in which a material of low refractive index and a material of high refractive index are alternately arranged in a period shorter than the wavelength.

FIG. 9 is a drawing showing the constitution of the above-described wavelength filter. On the surface of a substrate 701, a diffraction grating that composed of a portion 703 and portion 705 and has a period A shorter than the wavelength $\lambda$ of light to be used is formed. The portion 703 and portion 705 are composed of materials with different refractive indices. The portion 703 and portion 705 form a layer 707.

When light enters, under a predetermined condition, diffracted lights of +1 order and −1 order is generated, whose waves proceed in a state nearly horizontal to the substrate surface and which can exist only in the layer 707. The wave of light is referred to as an evanescent wave, and the layer 707 is referred to as a waveguide layer. The predetermined condition is represented by the following formula when representing the angle of incident light by θ:

[Mathematical Formula 1]

$$\beta = \frac{2\pi}{\lambda}\sin\theta + \frac{2\pi}{\Lambda} \quad (1)$$

wherein β is a propagation factor. When representing the average refractive index of the waveguide layer 707 by

[Mathematical Formula 2]

$$\bar{n},$$

β is represented by the formula:

[Mathematical Formula 3]

$$\beta \approx \frac{2\pi}{\lambda}\bar{n}. \quad (2)$$

The thickness of the waveguide layer 707 satisfies the following formula:

[Mathematical Formula 4]

$$\bar{n} \cdot h = \frac{\lambda}{2}. \quad (3)$$

Here, the formulae (2) and (3) including the average refractive index are approximate ones, and it is necessary to carry out analysis while taking the behavior of electromagnetic wave between the waveguide layer and surrounding layers into consideration in actual analysis.

The evanescent wave that occurred when the formula (1) is satisfied can not transmit when light enters the boundary between the waveguide layer and the neighboring layer, and all the light is subjected to total internal reflection. Therefore, the structure shown in FIG. 9 forms a filter that reflects the light with a very narrow wavelength band determined according to the formula (1).

However, in the reflection characteristic thereof, there is such problem that the reflectivity largely lowers in accordance with a minute wavelength variation and thus an intended half-value width (bandwidth) can not be realized.

In order to solve the problem, D. K. Jacob, S C. Dunn and M. G. Moharam: "Flat-top narrow-band spectral response obtained from cascaded resonant grating reflection filters," Applied Optics Vol. 41 No. 7 1241-1245 (2002) discloses a wavelength filter in which the wavelength band with the maximum reflectivity is broadened by using materials of 4 types of refractive indices. In the wavelength filter, plural grating structures formed by alternately arranging a material of low refractive index and a material of high refractive index at a predetermined period and thin films with the remaining two types of refractive indices interposed between the plural grating structures are laminated in the incident direction of light.

In addition, S. T. Thurman and G. M. Morris: "Controlling the spectral response in guided-mode resonance filter design," Applied Optics Vol. 42 No. 16 3225-3233 (2003) discloses a wavelength filter in which a wavelength band with the maximum reflectivity is broadened by similarly laminating grating structures by using only 2 types of materials with a low refractive index and a high refractive index.

In either of the structures described in the documents of D. K. Jacob, S. C. Dunn et al. and S. T. Thurman et al., a broad wavelength band can be obtained by laminating plural grating structures. A broad wavelength band can be obtained because plural wavelengths that bring about the resonance effect are caused to exist, and respective spectra overlap with each other to broaden the wavelength band.

However, in order to produce these structures, the step of producing plural grating structures and the step of evaporating a material of thin film in plural times are required, and the control of the grating structure and thin film height with a high accuracy is required in respective steps. In addition, along with the broadening of the wavelength band, the number of the grating structures to be laminated increases. As the result, as is the case for filters according to conventional thin film techniques, the production process becomes complicated to increase the cost, and the constitution becomes complicated to make it difficult to suppress variation of performance.

Further, since plural grating structures are laminated, the total height (thickness) becomes large.

DISCLOSURE OF THE INVENTION

Under the above-described back ground, there is the need for a wavelength filter with a broad wavelength band having a simple structure with a small number of types of the thin film and laminations, being produced with a simple process, and having a small variation of the performance.

The wavelength filter according to the present invention is composed of grating in which a first portion extending in X direction and a second portion composed of a material having a refractive index higher than that of the material of the first portion and extends in the X direction along the first portion on the substrate surface are arranged in Y direction perpendicular to the X direction on the substrate surface alternately in a period shorter than the wavelength of light to be used. In the wavelength filter of the present invention, the cross-sectional figure of respective first portions in the Y direction and perpendicular to the substrate surface is provided with at least one protruding portion so as to become wider in the width of Y direction than that of neighboring portions within a predetermined range of distance apart from the substrate surface by a predetermined distance in Z direction. The wavelength filter of the present invention is constituted so that plural waveguide layers parallel to the substrate surface and divided by regions parallel to the substrate surface in the predetermined range of distance are formed, and that wavelength bands of lights reflected from the plural waveguide layers shift while overlapping with each other to reflect light with a wavelength band broader than that of light reflected from a single waveguide layer.

The wavelength filter of the present invention reflects light with a broad wavelength band, and further, has a simple structure with a small number of the types of thin film and laminations, is produced by a simple process, and has a small variation of performance.

According to one embodiment of the present invention, it is constituted so that the wavelength bands of light reflected from the plural waveguide layers shift while overlapping with each other by altering the predetermined range of distance.

In this way, by altering the position or width of the protruding portion of the first portion in the Z direction, it is possible to reflect light with a wavelength band broader than that of light reflected from a single waveguide layer.

According to another embodiment of the present invention, it is constituted that the wavelength bands of light reflected from the plural waveguide layers shift while overlapping with each other by altering the average refractive index of the plural waveguide layers.

By setting the widths of the plural portions not protruding of the first portion in the Y direction to be different from each other, it is possible to allow light with a wavelength band broader than that of light reflected from a single waveguide layer to be reflected.

According to another embodiment of the present invention, the material of the first portion is any of glass, plastic or silicon.

According to another embodiment of the present invention, the material of the second portion is any of titanium oxide, magnesium fluoride or silicon oxide.

According to another embodiment of the present invention, the material of the second portion is either germanium or zinc selenide.

In the method for producing the wavelength filter according to the present invention, the above-described cross-sectional figure is plotted by irradiating beams from the X direction.

Therefore, even a grating having a protruding portion can be produced in the same way as the case of producing an ordinary grating.

BEST MODES FOR CARRYING OUT THE INVENTION

Figure 1:
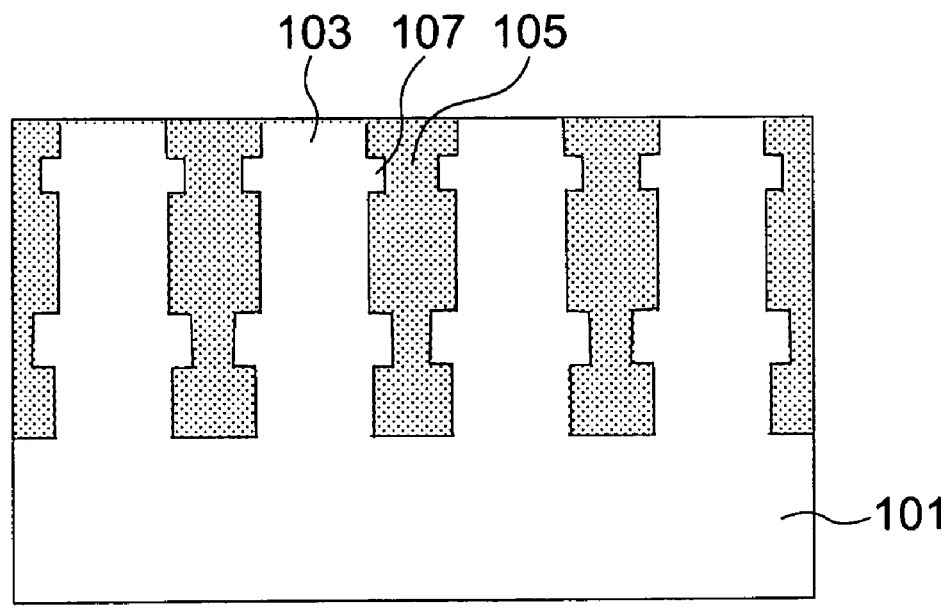
FIG. 1 is a cross-sectional view showing a constitution of the wavelength filter according to one embodiment of the present invention.

FIG. 1 is a cross-sectional view showing the constitution of the wavelength filter according to one embodiment of the present invention. The cross-section in FIG. 1 is perpendicular to a substrate surface 101, and is a face in the direction perpendicular to the extending direction of the grating. The grating is provided with a period Λ shorter than the wavelength of light to be used, and is composed of the portion A represented by a symbol 103 and the portion B represented by a symbol 105. The portion A and portion B are composed of materials having different refractive indices. The portion A is provided with a portion 107 that protrudes so as to be wider than neighboring portions within a predetermined region of height (distance from the substrate surface). In FIG. 1, the portion A is provided with protruding portions within the range of two heights.

Figure 2:
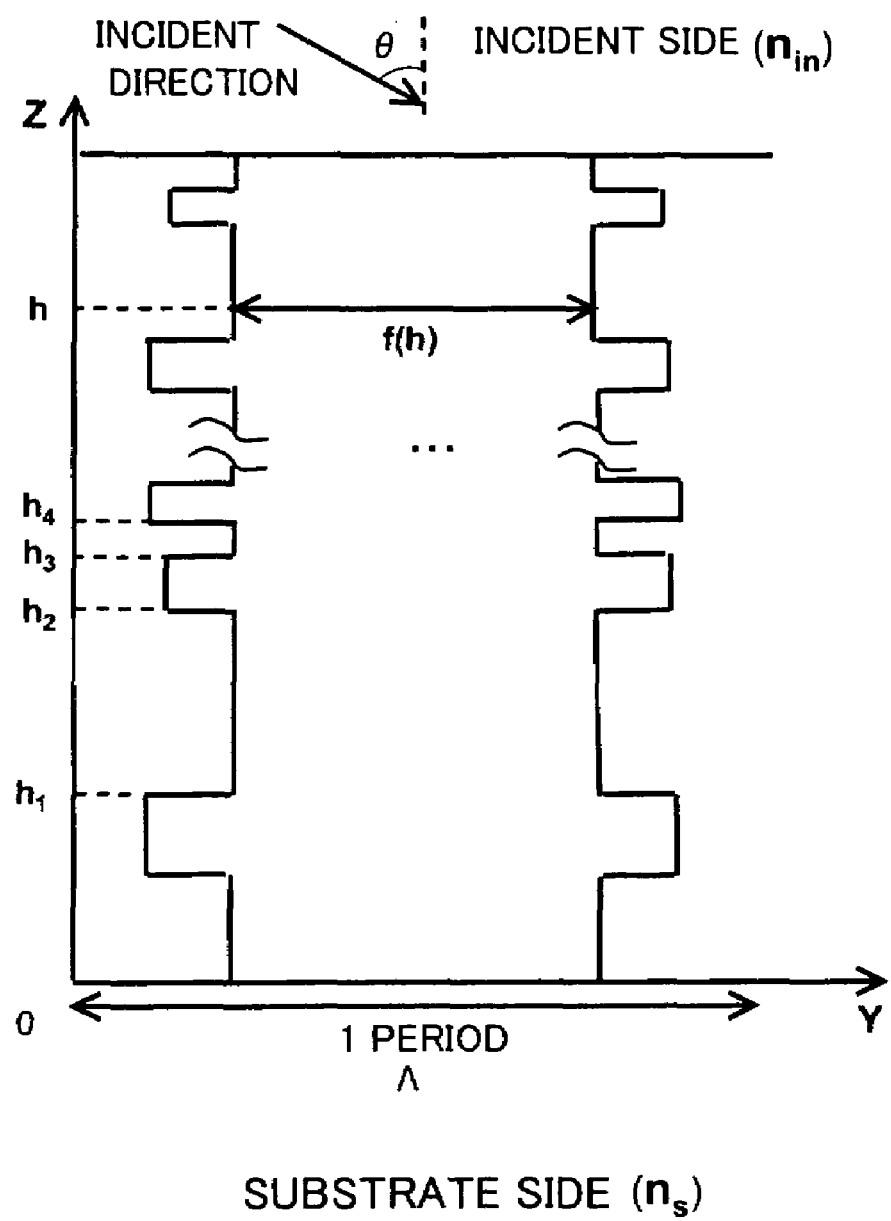
FIG. 2 is a cross-sectional view showing a detailed constitution of the portion A of the wavelength filter according to the one embodiment of the present invention.

FIG. 2 is a cross-sectional view showing a detailed constitution of the portion A of the wavelength filter according to one embodiment of the present invention. The cross-section in FIG. 2 is the same as the cross-section in FIG. 1. In FIG. 2, the direction perpendicular to the extending direction of the grating in the substrate surface is represented by Y, and the height direction of the grating is represented by Z. While defining the grating height being the distance from the substrate surface as h, the width of the portion A at the grating height h is represented by f(h). The refractive indices of the portion A and portion B at the grating height h are represented by $n_1(h)$ and $n_2(h)$, respectively.

In this case, the average refractive indices $n_{TE}(h)$ and $n_{TM}(h)$ for TE-polarized light and TM-polarized light, respectively, of a layer parallel to the substrate surface in the vicinity of the grating height h can be represented by the following formula.

[Mathematical Formula 5]

$$n_{TE}(h) = \sqrt{(1 - F(h))n_1(h)^2 + F(h)n_2(h)^2} \quad (4)$$

$$n_{TM}(h) = \sqrt{\frac{\frac{1}{\frac{(1-F(h))}{n_1(h)^2} + \frac{F(h)}{n_2(h)^2}}\cos\theta + \frac{((1-F(h))n_1(h)^2 + F(h)n_2(h)^2)\sin\theta}{\cos\theta + \sin\theta}}} \quad (5)$$

wherein θ is an angle of incident light relative to the substrate surface. F(h) is a duty ratio of the portion A, which can be represented by $$F(h) = f(h)/\Lambda.$$

Here, when assuming that the refractive index $n_2(h)$ of the portion B is higher than the refractive index $n_1(h)$ of the portion A, and representing the average refractive index of a thin layer parallel to the substrate surface at the grating height h by n(h), the following formulae are satisfied for TE-polarized light and TM-polarized light from formulae (4) and (5).

$$n_{in} \leq n_s < n(h=h_2 \sim h_3) < n(h=h_1 \sim h_2) \quad (6)$$

$$n_{in} \leq n_s < n(h=h_2 \sim h_3) < n(h=h_3 \sim h_4) \quad (7)$$

wherein $h=h_1 \sim h_2$ represents an arbitrary height h of the grating height h within the range of $h_1$ and $h_2$, and $n(h=h_1 \sim h_2)$ shows the average refractive index at the arbitrary height. In addition, $n_{in}$ represents the refractive index of a medium on the incident side, and $n_s$ represents the refractive index of the substrate.

From the formulae (6) and (7), a layer with the grating height h in the range of $h_1$ and $h_2$ and a layer with the grating height h in the range of $h_3$ and $h_4$ have a higher refractive index than a layer with the height in the range of $h_2$ and $h_3$, and form 2 waveguide layers.

Figure 3:
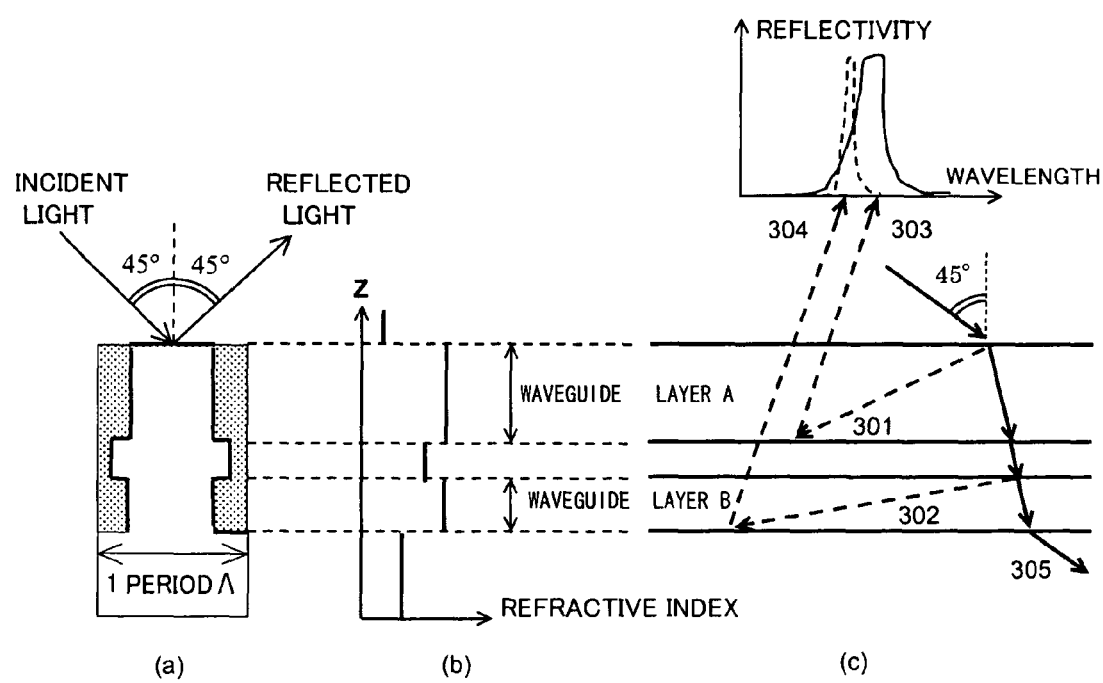
FIG. 3 is a drawing for illustrating the principle of the wavelength filter of the present invention.

FIG. 3 is a drawing illustrating the principle of the wavelength filter of the present invention. FIG. 3(a) is a cross-sectional view showing the constitution of the portion A of the grating. FIG. 3(b) is a drawing showing the distribution of refractive indices in the height direction of the grating (Z direction). As described in association with FIG. 2, two waveguide layers A and B are formed in the height range of a portion with a narrow width of the portion A. Most of the entered light passes through the waveguide layers A and B as transmitting light 305. When the formula (1) is satisfied for each of waveguide layers A and B, evanescent waves 301 and 302 occur, and reflected waves 303 and 304 caused by total internal reflection occur. Therefore, when the constitutions of waveguide layers A and B are determined so that a wavelength at which a reflected wave occurs in the waveguide layer A and a wavelength at which the reflected wave occurs in the waveguide layer B slightly differ from each other, the band of reflected wavelength from the waveguide layer A and the band of reflected wavelength from the waveguide layer B overlap with a slight displacement, as shown in a solid line and a dotted line, respectively, in the graph of reflectivity versus wavelength in FIG. 3(c). As the result, the band of the reflected wavelength can be broadened.

Materials of the portion A and portion B will be described. As the material of the portion A, glass, plastic, silicon or the like can be employed. The refractive index thereof is desirably set as low as possible, so that the difference between it and the refractive index of the material of portion B becomes as large as possible. Therefore, glass or plastic is preferred.

As the material of portion B, materials for forming ordinary thin films can be employed. As the thin film material, titanium oxide ($TiO_2$), magnesium fluoride ($MgF_2$), silicon oxide ($SiO_2$) or the like can be mentioned and, in particular, titanium oxide ($TiO_2$) or magnesium fluoride ($MgF_2$) with a high refractive index is preferred. Further, when the wavelength of incident light extends into the infrared region, for example, germanium (Ge) or zinc selenide (ZnSe) can be utilized.

Next, the method for producing the wavelength filter of the present invention will be described.

Figure 4:
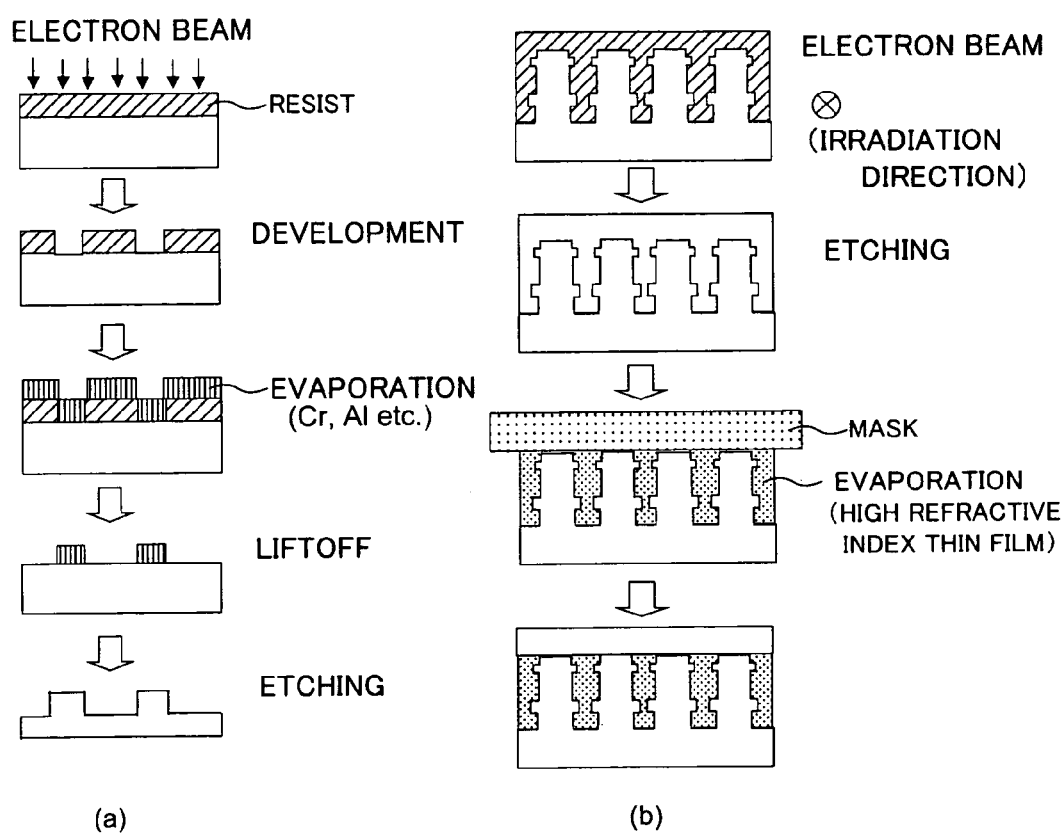
FIG. 4 is a drawing schematically showing the production process of the wavelength filter according to the present invention.

FIG. 4(a) is a drawing schematically showing a production process from plotting to etching according to a general lithographic technique. As the means for plotting, electron beams are used here. Details of the production process are as follows.

First, a resist is deposited on a substrate, which is irradiated with electron beams so as to give a designed pattern. Either a positive type resist or negative type one may be used. One resulting in a less plotted area is selected. The resist plotted by electron beams is subjected to development treatment to remove the resist. Next, in order to make the final depth at etching as large as possible, a metal such as Cr or Al is evaporated on the resist, and then liftoff is carried out to remove the resist portions, thereby forming a minute structure with a deposited metal film. When etching is carried out in this state, the etching proceeds slowly due to the effect of the metal film, thus finally a cross-sectional figure having a deep groove can be obtained.

FIG. 4(b) is a drawing schematically showing the production process of the wavelength filter according to the present invention. The production process from the plotting to the etching is the same as that in FIG. 4(a), but the irradiation direction of electron beams is set to be perpendicular to the face of the paper of FIG. 4(b). After forming the portion A by the etching, evaporation is carried out so as to form the portion B composed of a material with a high refractive index between the portion A and portion A after arranging a mask of, for example, metal. After the end of the evaporation, the mask is removed to give the wavelength filter according to the present invention, in which the portion A and portion B are alternately arranged.

The production method of the wavelength filter according to the present invention has been described here while quoting a lithographic technique by electron beams as an example. The wavelength filter of the present invention can also be produced by methods other than this method. For example, a production method referred to as the LIGA process being similarly known widely may be employed, in which X rays are irradiated from a beam source in place of electron beams upon plotting.

A numerical example of the wavelength filter of the present invention will be shown. In order to calculate the reflection characteristic from the grating structure, a calculation procedure referred to as Rigorous Coupled Wave Analysis (RCWA) was used. This procedure is a rigorous calculation method for calculating an electromagnetic wave, and is a method widely utilized to accurately calculate the resonance effect.

Figure 5:
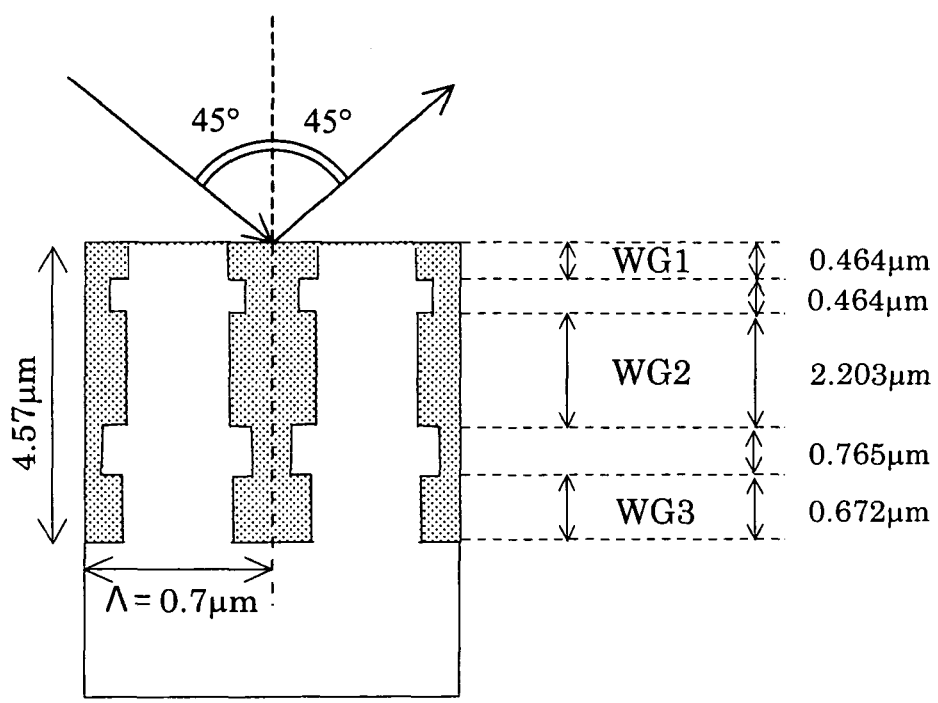
FIG. 5 is a cross-sectional view of a wavelength filter having strong reflection characteristic at a central wavelength of 1550 nm when TE-polarized light enters at an oblique angle of 45° relative to the substrate.

FIG. 5 is a cross-sectional view of a wavelength filter of a first numerical example having a strong reflection characteristic at the central wavelength of 1550 nm when TE-polarized light enters at an oblique angle of 45° relative to the substrate. Here, the period of the grating composed of the portion A and portion B is 0.7 μm, and grating height is 4.57 μm. The material of the substrate and portion A is $SiO_2$ (refractive index: 1.44), and the material of the portion B is $TiO_2$ (refractive index: 2.0). The portion A is provided with wide portions within two ranges (0.672-1.437 μm and 3.64-4.104 μm) of the height of the grating. Accordingly, regions of three height ranges separated by the above-described two height ranges form waveguide layers WG1, WG2 and WG3. The thicknesses of the waveguide layers WG1, WG2 and WG3 are 0.464 μm, 2.203 μm and 0.672 μm, respectively.

The width of the portion A in the cross-section is as follows in the order from the incident light side to the substrate side:
(incident light side)
width 0.487 μm (WG1)
width 0.626 μm
width 0.487 μm (WG2)
width 0.626 μm
width 0.487 μm (WG3)
(substrate side).

The average refractive index of the waveguide layers WG1 to WG3 is about 1.86 from the formula (4). When the reflection wavelength is 1.55 μm, the thickness of a waveguide layer expected from the formula (3) becomes about 0.417 μm, which is a value close to the thickness of the waveguide layer WG1. Since the reflection wavelength has been shifted, the thickness of the waveguide layer WG3 is larger than that of the waveguide layer WG1. The thickness of the waveguide layer WG2 is far larger than the above-described expected thickness of the waveguide layer. The purpose of this is to reduce the mutual effect of the waveguide layer WG1 and waveguide layer WG3 as far as possible.

As described above, in the wavelength filter of the numerical example 1 as shown in FIG. 5, the thicknesses of the plural waveguide layers are altered by altering the position or width in Z direction of the protruding portion of the portion A, and, as the result, the band of reflected wavelength is broadened.

Figure 6:
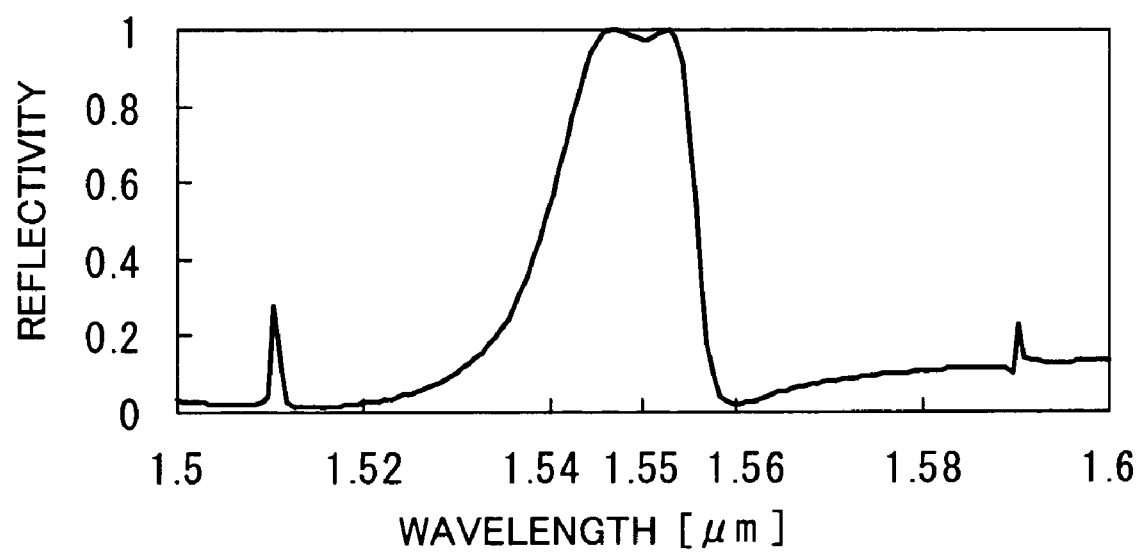
FIG. 6 is a drawing showing the calculation result of the reflection spectrum for the wavelength filter of FIG. 5.

FIG. 6 is a drawing showing the calculation result of the reflection spectrum for the wavelength filter in FIG. 5. The horizontal axis represents the wavelength, and the vertical axis represents the reflectivity. The bandwidth having the reflectivity of 97% or more with the central wavelength of 1550 nm is 8.3 nm. Thus, it can be understood that the wavelength filter according to the present invention has a relatively broad bandwidth with a predetermined central wavelength.

Figure 7:
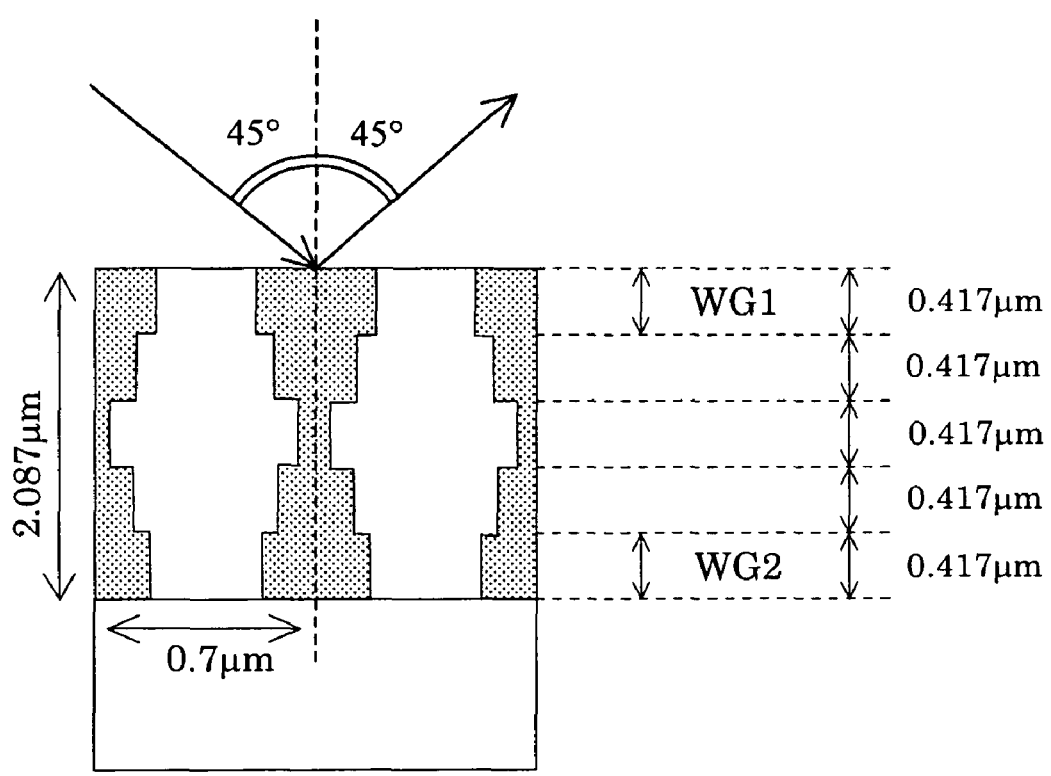
FIG. 7 is a cross-sectional view of the wavelength filter according to a second numerical example having strong reflection characteristic at the central wavelength of 1550 nm when TE-polarized light enters at an oblique angle of 45° relative to the substrate.

FIG. 7 is a cross-sectional view of the wavelength filter of a second numerical example, having a strong reflection characteristic at the central wavelength of 1550 nm when TE-polarized light enters at an oblique angle of 45° relative to the substrate. Here, the period of the grating composed of the portion A and portion B is 0.7 μm, and the grating height is 2.087 μm. The material of the substrate and portion A is $SiO_2$ (refractive index: 1.44), and the material of the portion B is $TiO_2$ (refractive index: 2.0). The portion A is provided with a wide portion in one range of the height of the grating (0.417-1.668 μm). Therefore, regions of two height ranges separated by above-described one height range form the waveguide layers WG1 and WG2. The thicknesses of the waveguide layers WG1 and WG2 are 0.417 μm, respectively.

Widths of the portion A in the cross-section is as follows in the order from the incident light side to the substrate side:
(incident light side)
width 0.441 μm (WG1)
width 0.630 μm
width 0.693 μm
width 0.630 μm
width 0.490 μm (WG2)
(substrate side)

The average refractive indices of the waveguide layer WG1 and WG2 are about 1.81 and about 1.85, respectively, from the formula (4).

As described above, in the wavelength filter of the numerical example 2 as shown in FIG. 7, refractive indices of the plural waveguide layers are altered by setting the widths in the Y direction of the plural portions not protruding of the portion A to differ from each other, and, as the result, the band of the reflected wavelength is broadened.

Figure 8:
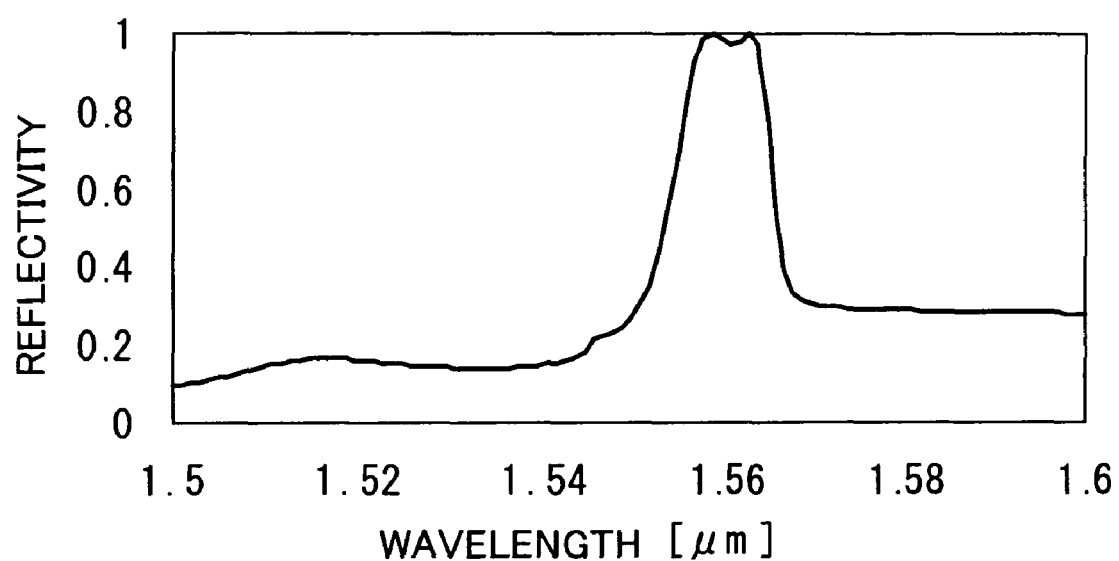
FIG. 8 is a drawing showing the calculation result of the reflection spectrum for the wavelength filter of FIG. 7.
Figure 9:
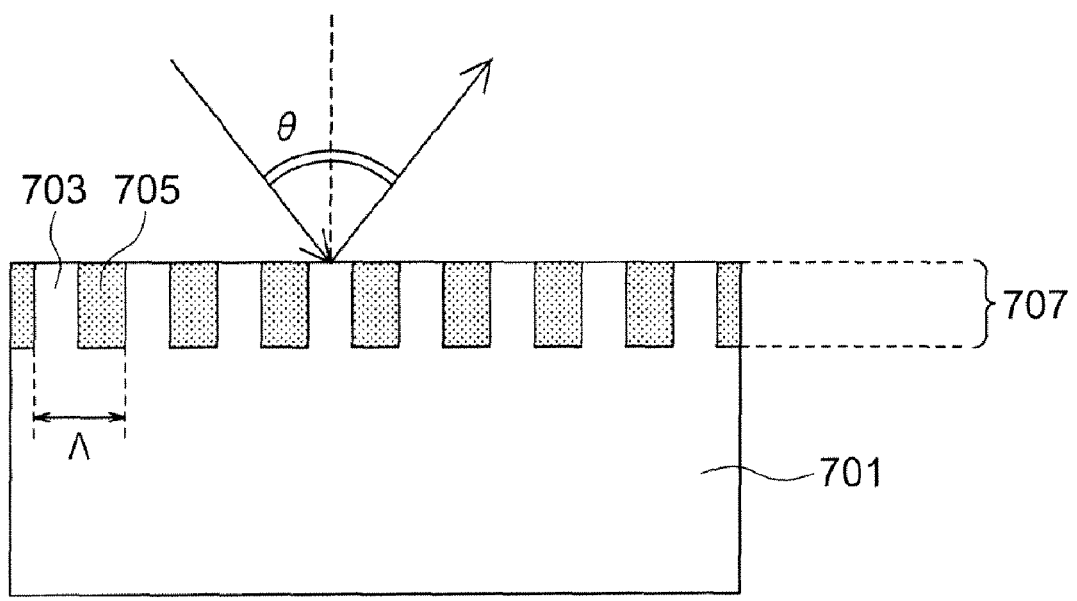
FIG. 9 is a drawing showing the constitution of a wavelength filter according to a conventional technique.

FIG. 8 is a drawing showing the calculation result of the reflection spectrum of the wavelength filter in FIG. 7. The horizontal axis represents the wavelength, and the vertical axis represents the reflectivity. The bandwidth having the reflectivity of 97% or more with the central wavelength of 1550 nm is 12 nm. Thus, it can be understood that the wavelength filter according to the present invention has a relatively broad bandwidth with a predetermined central wavelength.

The adjustment of the bandwidth of reflection spectrum is effected by altering the thickness of the waveguide layer or the total number of the waveguide layers. Usually, a larger thickness of the waveguide layer can result in a broader bandwidth, and a smaller thickness can lead to a narrower bandwidth. Or, it can be also realized by altering the number of waveguide layers by altering the number of protruding portions of the portion A. In this case, usually, a reduced number of protruding portions of the portion A can result in a narrower bandwidth, and a more increased number of protruding portions of the portion A can broaden the bandwidth. In the adjustment of the bandwidth, a larger difference between the refractive index of the portion A and that of the portion B is preferred.

Further, as shown in the numerical example 2, the bandwidth may be broadened by altering the refractive index of waveguide layer.

Alteration of the central wavelength of reflection spectrum can be realized by altering the size relating to the length such as the grating period and height. It can be realized, usually, to the shorter wavelength side by shortening respective sizes of the grating period and/or height, and to the longer wavelength side by lengthening respective sizes.

In the above-described specific examples, conditions when light enters obliquely to the grating structure are set, but it is also possible to effect the similar function when light enters perpendicular to the grating structure. In addition, the above description is for TE-polarized light, but the same applies to TM-polarized light.

The invention claimed is:
1. A wavelength filter, comprising:
a grating in which a first portion extending in X direction on a substrate surface and a second portion, composed of a material with a refractive index higher than that of a material of the first portion and extending in the X direction along the first portions, are alternately arranged in Y direction perpendicular to the X direction on the substrate surface at a predetermined cycle Λ shorter than a wavelength of light to be used, λ
   wherein the wavelength filter is configured so that a cross-sectional figure of respective first portions in the Y direction and perpendicular to the substrate surface is provided with at least one protruding portion so as to become wider in the width of Y direction than that of neighboring portions within a predetermined range of distance apart from the substrate surface by a predetermined distance in Z direction to form plural waveguide layers parallel to the substrate surface and divided by regions parallel to the substrate surface in the predetermined range of distance, each of the waveguide layers reflecting light satisfying $$\beta \equiv \frac{2\pi}{\lambda}\sin\theta + \frac{2\pi}{\Lambda}$$

where
θ
represents an incident angle to the substrate of the light, and
β
represents a propagation factor of said each waveguide layers, and that wavelength bands of light reflected from the plural waveguide layers shift while overlapping with each other to reflect light with a wavelength band broader than that of light reflected from a single waveguide layer.

2. The wavelength filter according to claim 1 being constituted so that the wavelength bands of light reflected from the plural waveguide layers shift while overlapping with each other by altering the predetermined range of distance.

3. The wavelength filter according to claim 1 being constituted so that the wavelength bands of light reflected from the plural waveguide layers shift while overlapping with each other by altering average refractive index of the plural waveguide layers.

4. The wavelength filter according to claim 1, wherein the material of the first portion is any of glass, plastic or silicon.

5. The wavelength filter according to claim 1, wherein the material of the second portion is any of titanium oxide, magnesium fluoride or silicon oxide.

6. The wavelength filter according to claim 1, wherein the material of the second portion is either germanium or zinc selenide.

7. A method for producing the wavelength filter according to claim 1, comprising the step of plotting the cross-sectional figure by irradiating a beam from the X direction.

* * * * *